Feb. 19, 1963 TOSHIO TAKAHASHI 3,078,207
METHOD OF LAMINATING METAL PLATES WITH A PLASTIC FILM
Filed Jan. 26, 1960
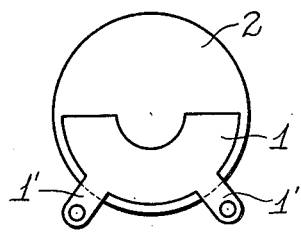
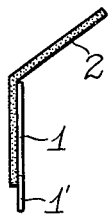  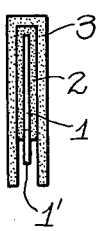
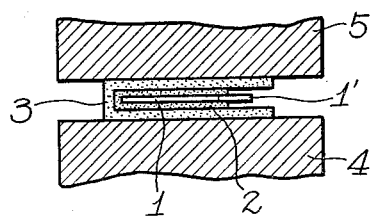
INVENTOR
Toshio Takahashi
BY Pierce, Scheffler & Parker
ATTORNEYS 3,078,207
METHOD OF LAMINATING METAL PLATES WITH A PLASTIC FILM
Toshio Takahashi, Setagaya-ku, Tokyo, Japan, assignor to Kikuna Electric Company, Limited, Yokohama, Japan, a corporation of Japan
Filed Jan. 26, 1960, Ser. No. 4,761
2 Claims. (Cl. 156—247)

This invention relates to a method of laminating thin metal plates such as are used, for example, for plates in variable condensers with a polyethylene film having a uniform thickness.

It has been very difficult to laminate the whole periphery of such a small thin metal plate as is, for example, about 0.05 to 0.2 mm. thick for a variable condenser with a polyethylene film having a uniform thickness. It has also been very difficult even when a metal plate could be laminated with a polyethylene film to make the thickness of the layer of the polyethylene film uniform and especially to laminate the edge portions of the metal plate also with the polyethylene film.

A principal object of the present invention is to provide a method of adhesively laminating thin metal plates with a uniform polyethylene film.

Another object of the present invention is to provide a method of laminating not only the broad surfaces but also the end surfaces and edge portions of a thin metal plate with a polyethylene film having the same thickness as in the other parts of the plate.

According to the present invention, there is provided a method of laminating metal plates with a polyethylene film characterized in that a polyethylene film is arranged on both sides of a thin metal plate to be laminated with the film, plate-shaped mold bodies are then arranged on both sides of the above arrangement, the polyethylene film and metal plate are heated and pressed through said plate-shaped bodies and then the plate-shaped bodies are peeled off.

The present invention shall now be explained with reference to an embodiment shown in the drawings in which FIGURES 1 to 5 show the steps of the polyethylene film laminating method according to the present invention.

In the drawings, 1 is a thin metal plate and 2 is a polyethylene film in such form as will cover the metal plate 1 when bent around it. The metal plate 1 is placed on the polyethylene film 2 as shown in FIGURE 1. The polyethylene film 2 is bent in the middle as shown in FIGURE 2. The metal plate is covered on both surfaces with the bent polyethylene film 2 so as to expose the terminal parts 1′ of the metal plate 1 as shown in FIGURE 3. Then the polyethylene film 2 now covering the metal plate is covered thereon, for example, with a polyethylene terephthalate film 3 serving as a mold body. When the plate in such state is held in a press, in which a press stand 4 and a pressing plate 5 have been warmed to about 130 to 150° C. in advance, as shown in FIGURE 5 and is pressed together for about 4 to 5 seconds by the press, then the metal plate 1, the polyethylene film 2 and the polyethylene terephthalate film 3 will adhere to one another due to heat and pressure. When they adhering to one another as in a unitary body are taken out and are left to stand naturally in air, the polyethylene terephthalate film will be able to be easily peeled off in about 5 to 7 seconds.

Thus the metal plate can be coated on all the surfaces with a polyethylene film of a uniform thickness. The polyethylene resin film closely adhering to the metal plate can be formed to be of a thickness as precise as about $\frac{1}{100}$ mm. by controlling the thickness of the polyethylene terephthalate film and the stroke of the pressing plate.

According to the present invention, as described above, the flat surfaces, end surfaces and edge portions of a thin metal plate can all be coated with a polyethylene film having a uniform thickness. The operation of the method of the present invention is easier than that of a method wherein a plastic powder is used in coating metal plates with a plastic film. If, in consideration of the shape of the thin metal plate, the polyethylene film is so formed as to expose the parts of fitting holes necessary for conduction in the plate as the plastic film is bent, said parts will not be coated with the polyethylene film. There will be no need of such operation as scraping off the polyethylene film otherwise adhering to those parts. Therefore, there is an advantage that, when the thus coated metal plates are used as plates for variable condensers, the whole assembling operation will be made easier and the plate will be coated with a plastic film having a uniform thickness, so that a number of condensers having a uniform capacity can readily be produced.

In the above described embodiment, the case of coating a metal plate with the polyethylene resin film has been explained. However, the invention can be worked with a vinyl chloride resin. It is possible to use a mica plate in place of the polyethylene terephthalate molding film in the pressing operation. Any plate-shaped body whose melting point is higher than that of the polyethylene film and whose surface is flat can be freely used in the present invention.

What I claim is:

1. A method of making a variable condenser plate consisting essentially of the following succession of steps: (1) folding a polyethylene film about a thin metal plate having terminal tabs extending from an edge thereof in such a manner as to expose said tabs while covering said plate, that edge of said plate which is remote from said tabs being within the fold of polyethylene film; (2) enclosing the resulting composite within a fold of polyethylene terephthalate film having a width greater than said polyethylene film, said composite being so disposed in the fold of said polyethylene terephthalate film that said terminal tabs are disposed adjacent the open end of said fold of polyethylene terephthalate film while the flat surfaces and bent portion of said polyethylene film are fully covered by said fold of polyethylene terephthalate film; (3) pressing and simultaneously heating the resulting potential laminate to adhere said polyethylene film securely to the flat surfaces and edge portion of said metal plate and to mold the polyethylene covering to a predetermined uniform thickness; and (4) thereafter stripping the polyethylene terephthalate film from the resulting laminate.

2. The method defined in claim 1, further characterized in that in step 2 the edges of the polyethylene terephthalate film remote from the fold in said film extend beyond the corresponding edges of the underlying polyethylene film.

References Cited in the file of this patent

UNITED STATES PATENTS

| | | |
|---|---|---|
| 1,871,492 | Brennecke | Aug. 16, 1932 |
| 2,565,301 | Foster et al. | Aug. 21, 1951 |
| 2,613,397 | Borkland | Oct. 14, 1952 |
| 2,688,582 | Phair et al. | Sept. 7, 1954 |
| 2,703,772 | Keithy | Mar. 18, 1955 |
| 2,764,718 | Peck et al. | Sept. 25, 1956 |

FOREIGN PATENTS

| | | |
|---|---|---|
| 669,154 | Great Britain | Mar. 26, 1952 |